(12) United States Patent
Inui et al.

(10) Patent No.: US 7,376,910 B2
(45) Date of Patent: May 20, 2008

(54) DISPLAYING OBJECTS USING GROUP AND OBJECT PRIORITY LEVELS

(75) Inventors: Takashi Inui, Yokohama (JP); Mizuho Tadokoro, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 10/248,133

(22) Filed: Dec. 19, 2002

(65) Prior Publication Data

US 2003/0122879 A1  Jul. 3, 2003

(30) Foreign Application Priority Data

Dec. 27, 2001 (JP) ............................. 2001-398623

(51) Int. Cl.
*G06F 3/048* (2006.01)

(52) U.S. Cl. ...................... 715/797; 715/794; 715/853

(58) Field of Classification Search ................ 715/850, 715/853, 854, 517, 762, 713, 793, 794, 797, 715/807

See application file for complete search history.

(56) References Cited

U.S. PATENT DOCUMENTS

| | | | | |
|---|---|---|---|---|
| 6,111,578 A | * | 8/2000 | Tesler .......................... | 715/853 |
| 6,606,105 B1 | * | 8/2003 | Quartetti ..................... | 715/853 |
| 7,234,111 B2 | * | 6/2007 | Chu et al. ................... | 715/517 |

FOREIGN PATENT DOCUMENTS

| | | |
|---|---|---|
| JP | 64-018226 | 1/1989 |
| JP | 05-274106 | 10/1993 |
| JP | 07-219739 | 8/1995 |
| JP | 10/124284 | 5/1998 |
| JP | 10-232755 | 9/1998 |
| JP | 2000-194473 | 7/2000 |
| JP | 2000-348206 | 12/2000 |
| JP | 2001-060134 | 3/2001 |
| JP | 2001-147760 | 5/2001 |

* cited by examiner

*Primary Examiner*—Weilun Lo
*Assistant Examiner*—Truc Truong Chuong
(74) *Attorney, Agent, or Firm*—Gerald R. Woods

(57) ABSTRACT

A display device which displays a plurality of objects on a screen has a group configuration storage section for storing association information indicating the association between each of the plurality of objects and one of a plurality of groups, a group priority level storage section for storing group display priority levels which are priority levels for displaying each of the objects associated with one of the groups at the front of the objects associated with the other groups, an object priority level storage section for storing object display priority levels which are priority levels for displaying one of the objects associated with one of the groups at the front of the others, an object priority level changing section for changing the object display priority level while the association information is maintained, and a display section for displaying the plurality of objects according to the group display priority levels and the object display priority levels.

8 Claims, 11 Drawing Sheets

| GROUP NAME | GROUP DISPLAY PRIORITY LEVEL | OBJECT NAME | OBJECT DISPLAY PRIORITY LEVEL |
|---|---|---|---|
| FIRST GROUP 202 | 1 | FIRST OBJECT 210 | 1 |
| | | SECOND OBJECT 220 | 2 |
| SECOND GROUP 204 | 2 | THIRD OBJECT 230 | 1 |
| | | FOURTH OBJECT 240 | 2 |
| | | FIFTH OBJECT 250 | 3 |

*FIG. 2*

DISPLAYING OBJECTS USING GROUP AND OBJECT PRIORITY LEVELS

BACKGROUND OF THE INVENTION

The present invention relates to a display device, a display method, a display program and a recording medium. More particularly, the present invention relates to a display device, a display method, a display program and a recording medium for displaying objects in an overlaid state.

A window display device disclosed in Japanese Patent No. 3054120 enables setting of each of window objects in a hierarchical rank which represents the ordinal position of the window objects as numbered in the backward direction.

However, there is a need to define hierarchical ranks of window objects on an object-by-object basis. Therefore, in a case where a plurality of window objects relating to each other exist, it is not possible to set them in the same hierarchical rank.

BRIEF SUMMARY OF THE INVENTION

It is therefore a purpose of the present invention to provide a display device, a display method, a display program and a recording medium which make it possible to solve the above-described problem. This purpose can be achieved by a combination of features set forth in the independent claims in the appended claims.

According to one aspect of the present invention, there is provided a display device which displays a plurality of objects on a screen, the display device having a group configuration storage section for storing association information indicating the association between each of the plurality of objects and one of a plurality of groups, a group priority level storage section for storing group display priority levels which are priority levels for displaying each of the objects associated with one of the groups at the front of the objects associated with the other groups, an object priority level storage section for storing object display priority levels which are priority levels for displaying one of the objects associated with one of the groups at the front of the others, an object priority level changing section for changing the object display priority level while the association information is maintained, and a display section for displaying the plurality of objects according to the group display priority levels and the object display priority levels.

According to another aspect of the present invention, there is provided a display method of displaying a plurality of objects on a screen, the display method including a step of storing association information indicating the association between each of the plurality of objects and one of a plurality of groups, a step of storing group display priority levels which are priority levels for displaying each of the objects associated with one of the groups at the front of the objects associated with the other groups, a step of storing object display priority levels which are priority levels for displaying one of the objects associated with one of the groups at the front of the others, a step of changing the object display priority level while the association information is maintained; and a step of displaying the plurality of objects according to the group display priority levels and the object display priority levels.

According to still another aspect of the present invention, there is provided a display program executable by a computer to display a plurality of objects on a screen, the display program including a module for making the computer obtain association information indicating the association between each of the plurality of objects and one of a plurality of groups, a module for making the computer obtain group display priority levels which are priority levels for displaying each of the objects associated with one of the groups at the front of the objects associated with the other groups, a module for making the computer obtain object display priority levels which are priority levels for displaying one of the objects associated with one of the groups at the front of the others, a module for making the computer store the object display priority levels and change the object display priority level while the association information is maintained, and a module for making the computer display the plurality of objects according to the group display priority levels and the object display priority levels.

According to a further aspect of the present invention, there is provided a recording medium on which a display program executable by a computer to display a plurality of objects on a screen is recorded, the display program including a module for making the computer obtain association information indicating the association between each of the plurality of objects and one of a plurality of groups, a module for making the computer obtain group display priority levels which are priority levels for displaying each of the objects associated with one of the groups at the front of the objects associated with the other groups, a module for making the computer obtain object display priority levels which are priority levels for displaying one of the objects associated with one of the groups at the front of the others, a module for making the computer store the object display priority levels and change the object display priority level while the association information is maintained, and a module for making the computer display the plurality of objects according to the group display priority levels and the object display priority levels.

BRIEF DESCRIPTION OF THE SEVERAL VIEWS OF THE DRAWINGS

Some of the purposes of the invention having been stated, others will appear as the description proceeds, when taken in connection with the accompanying drawings, in which:

FIG. 2 is a diagram showing an example of association information, object display priority levels, and group display priority levels stored in a group configuration storage section 100, an object priority level storage section 110, and a group priority level storage section 120;

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The present invention will be described with respect to embodiments thereof. The present invention defined in the appended claims is not limited to the embodiments described below, and all possible combinations of features of the present invention the present invention described with respect to the embodiments are not necessarily indispensable to the means for solving the problem according to the present invention.

Figure 1:
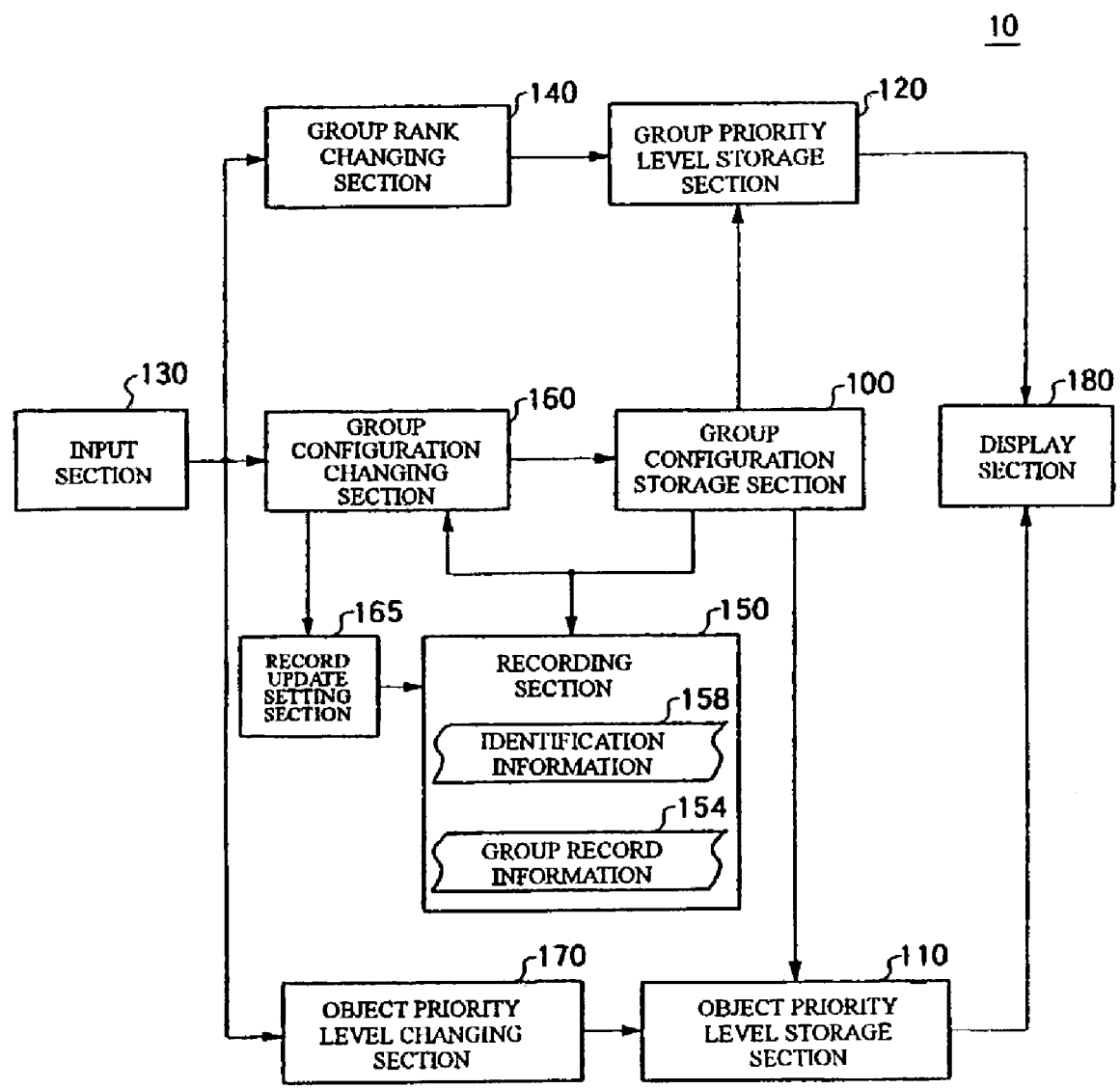
FIG. 1 is a functional block diagram of a display device 10 which represents a first embodiment of the present invention.

FIG. 1 is a functional block diagram of a display device 10 which represents a first embodiment of the present invention. The display device 10 has an input section 130 for accepting an input from a user, a group rank changing section 140 for changing group display priority levels, a group configuration changing section 160 for changing association information indicating associations between objects and groups, an object display priority level changing section 170 for changing object display priority levels, a group display priority level storage section 120 for storing group display priority levels, an object display priority level storage section 110 for storing object display priority levels, a group configuration storage section 100 for storing association information indicating associations between objects and groups, a recording section 150 for storing group record information 154 and identification information 158, a record update setting section 165 for setting whether group record information 154 will be updated according to a change in association information, and a display section 180 for displaying objects according to group display priority levels and object display priority levels.

The display device 10 displays a plurality of objects associated with a plurality of groups in an overlaid state. The display device 10 displays a plurality of objects according to group display priority levels and object display priority levels so that each of the objects is displayed at the front of some of the other objects lower in priority level. That is, the display device 10 displays, by referring to group display priority levels, all of objects associated with one group at the front of objects associated with other groups lower in group display priority level than the one group, and displays, by referring to object display priority levels, each of the objects associated with the one group at the front of some of the other objects lower in object display priority level.

The group configuration storage section 100 stores association information indicating associations between a plurality of objects and a plurality of groups. When the group configuration storage section 100 receives an instruction from the group configuration changing section 160 to change association information, it updates the association information. The group configuration storage section 100 provides association information to the group priority level storage section 120 and the object priority level storage section 110 if necessary.

The object priority level storage section 110 stores object display priority levels. Object display priority levels are priority levels for displaying each of a plurality of objects associated with one group at the front of some of the others. For example, one object associated with one group is displayed at the front of other objects associated with the same group and lower in object display priority level that the one object. However, if only object display priority levels are referred to, it is indefinite whether the one object is displayed at the front of other objects associated with other groups. When the object priority level storage section 110 receives an instruction from the object priority level changing section 170 to change object display priority levels, it updates the object display priority levels. The object priority level storage section 110 obtains association information from the group configuration storage section 100 and identifies objects associated with a plurality of groups. Also, the object priority level storage section 110 provides object display priority levels to the display section 180.

The group priority level storage section 120 stores group display priority levels. The group display priority levels are priority levels for displaying all of objects associated with one group at the front of objects associated with other groups. For example, one object associated with one group is displayed at the front of other objects associated with other groups lower in group display priority level. However, if only group display priority levels are referred to, it is indefinite whether the one object is displayed at the front of other objects associated with the one group. When the group priority level storage section 120 receives an instruction from the group rank changing section 140 to change group display priority levels, it updates the group display priority levels. Also, the group priority level storage section 120 obtains association information from the group configuration storage section 100 and identifies groups to be displayed according to the association information. Also, the group priority level storage section 120 provides group display priority levels to the display section 180.

The input section 130 accepts an input operation from a user. For example, in a case where the input section 130 accepts an object priority level changing operation, it transmits an object priority level changing instruction to the object priority level changing section 170. The input section 130 accepts, for example, a mouse clock as an object priority level changing operation. That is, a user can set the object priority level of a certain object to the highest level by clicking a mouse on the object.

In a case where the input section 130 accepts a group configuration changing operation from a user, it transmits a group configuration changing instruction to the group configuration changing section 160. The input section 130 accepts, for example, an operation on a special-purpose application program for changing the group configuration as a group configuration changing operation. A group configuration changing operation is different from an object priority level changing operation.

In a case where the input section 130 accepts a group rank changing operation from a user, it transmits a group rank changing instruction to the group rank changing section 140. The input section 130 accepts, for example, an operation on a special-purpose application program for changing group ranks as a group rank changing operation. A group rank changing operation is different from an object priority level changing operation.

When a new object is generated, the input section 130 may enable a user to do input to determine to which one of a plurality of groups the new object is associated. In this case, the input section 130 transmits to the group configuration changing section 160 an instruction to associate the new group with the group selected by the user. The input section 130 may perform an operation for associating a new object to one of a plurality of groups by using a special-purpose application.

When the group rank changing section 140 receives an object priority level changing instruction from the input section 130, it transmits to the group priority level storage section 120 an instruction to change group display priority levels. The group rank changing section 140 changes the group display priority levels stored in the group priority level storage section 120 by transmitting this instruction to change the group display priority levels. As described above, the group rank changing section 140 changes group display priority levels when the input section 130 accepts a group rank changing operation different from an object priority level changing operation.

The recording section 150 is nonvolatile and has group record information 154 and identification information 158. The recording section 150 obtains association information from the group configuration storage section 100. The recording section 150 updates identification information 158 and group record information 154 on the basis of an instruction received from the record update setting section 165. The recording section 150 provides identification information 158 and group record information 154 to the group configuration changing section 160.

The recording section 150 may store, for example, a title uniquely determined with respect to each object or a file name associated with each object as identification information 158. The recording section 150 may store a class name, a method name or a procedure name of a program associated with each object, and may store a name of a program by which an object has been generated.

The recording section 150 stores, as group record information 154, information indicating association between identification information 158 for identification of an object which has been displayed and a group to which the group is associated. For example, the recording section 150 stores information indicating association between a tile of an object, which is an example of identification information 158, and a group.

Therefore, even in a case where the display device 10 is rebooted because of occurrence of a fault therein, the recording section 150 can hold identification information 158 and group record information 154 before the fault and provide them to the group configuration changing section 160.

When the group configuration changing section 160 receives an object priority level change instruction from the input section 130, it transmits to the group configuration storage section 100 an instruction to change association information. The group configuration changing section 160 changes association information stored in the group configuration storage section 100 by transmitting this instruction to change the association information. The group configuration changing section 160 also transmits to the record update setting section 165 an instruction to update association information.

As described above, the group configuration changing section 160 changes association information stored in the group configuration storage section 100 when the input section 130 accepts a group configuration changing operation different from an object priority level changing operation.

The operation of the group configuration changing section 160 when a new object is generated will be described. The group configuration changing section 160 makes a determination as to whether an instruction to associate a new object with a group has been received from the input section 130. When receiving this instruction, the group configuration changing section 160 associates a new objects with a group according to this instruction. If the group configuration changing section 160 does not receive this instruction, it obtains group record information 154 and identification information 158 from the recording section 150. The group configuration changing section 160 makes a determination as to whether there is a certain relation between the object newly generated and any of objects identified from identification information 158. "Certain relation" between an object and another object is, for example, coincidence between their titles or file names of the kind stored as identification information. Alternatively, the relation may be coincidence between class names, methods names or procedure names associated with the objects, or may be coincidence between program names designating programs by which the objects were generated.

If the group configuration changing section 160 determines that there is a certain relation between the newly-generated object and an object identified from identification information 158, it associates the newly-generated object with the group with which the relating object is associated by group record information 154. If the group configuration changing section 160 determines that there is no certain relation between the newly-generated object and any of objects identified from identification information 158, it associates the newly-generated object with a group not highest in group display priority level.

The record update setting section 165 accepts from a user a setting as to whether group record information 154 will be updated. The record update setting section 165 also receives from the group configuration changing section 160 an instruction to update association information. When receiving this instruction, if a setting for updating group record information 154 has been made, the record update setting section 165 transmits to the recording section 150 an instruction to update group record information 154.

The object priority level changing section 170 changes object display priority levels while association information is maintained. That is, in changing object display priority levels, the object priority level changing section 170 does not require a user to change association information or to newly make an object. When the object priority level changing section 170 receives from the input section 130 an instruction to change object priority levels, it transmits to the object priority level storage section 110 an instruction to change object priority levels. The object priority level changing section 170 changes object priority levels stored in the object priority level storage section 110 by transmitting this instruction to change the object display priority levels.

The display section 180 obtains group priority levels from the group priority level storage section 120 and object priority levels from the object priority level storage section 110. The display section 180 displays a plurality of objects according to the group priority levels and the object priority levels. The display section 180 may display, as objects, windows for display of outputs from programs. Also, the display section 180 may display, as objects, drawing object in drawing software, i.e., characters, lines, circles, rectangles, etc.

FIG. 2 is table showing an example of the structure of data stored in the group configuration storage section 100, the object priority level storage section 110 and the group priority level storage section 120. Referring to FIG. 2, the group configuration storage section 100, the object priority level storage section 110 and the group priority level storage section 120 are integral with each other. The kinds of data stored in these sections are collectively shown in one table. This table is constituted by group names, group display priority levels, object names, and object display priority levels shown in this order from left. The association between group names and object names shown in this table is an example of association information in accordance with the present invention. A group having a smaller group display priority level value and an object having a smaller object display priority level value are displayed at the front of the others.

In the example shown in FIG. 2, a first object 210 and a second object 220 are associated with a first group 202, while a third object 230, a fourth object 240 and a fifth object 250 are associated with a second group 204. The displayed objects are the first object 210, the second object 220, the third object 230, the fourth object 240, and the fifth object 250 positioned in this order from the front.

Figure 3:
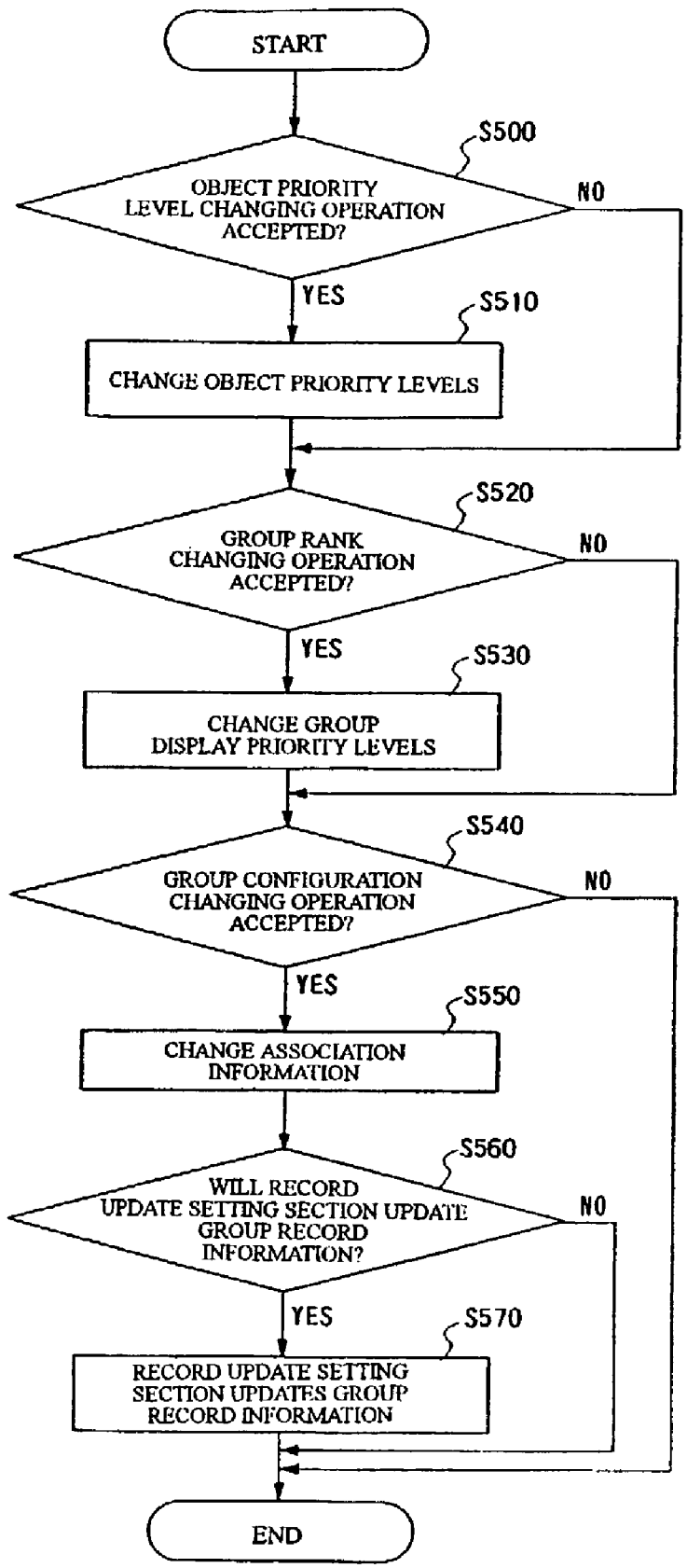
FIG. 3 is a flowchart showing the operations of an input section 130, a group rank changing section 140, a group configuration changing section 160, a record update setting section 165, and an object priority level changing section 170.

FIG. 3 shows an example of the operations of the input section 130, the group rank changing section 140, the group configuration changing section 160, the record update setting section 165, and the object display priority level changing section 170. The input section 130 makes a determination as to whether an object priority level changing operation has been accepted (S500). If the input section 130 determines that an object priority level changing operation has been accepted (S500: YES), the object display priority level changing section 170 changes object priority levels (S510). The input section 130 makes a determination as to whether a group rank changing operation has been accepted (S520). If the input section 130 determines that a group rank changing operation has been accepted (S520: YES), the group rank changing section 140 changes group display priority levels (S530). The input section 130 makes a determination as to whether a group configuration changing operation has been accepted (S540). If the input section 130 determines that a group configuration changing operation has been accepted (S540: YES), the group configuration changing section 160 changes association information (S550). The record update setting section 165 makes a determination as to which one of a setting to update group record information and a setting not to perform updating has been made (S560). If a setting to update group record information has been made in the record update setting section 165 (S560: YES, and S540: YES), the record update setting section 165 makes the recording section 150 update group record information (S570).

Figure 4:
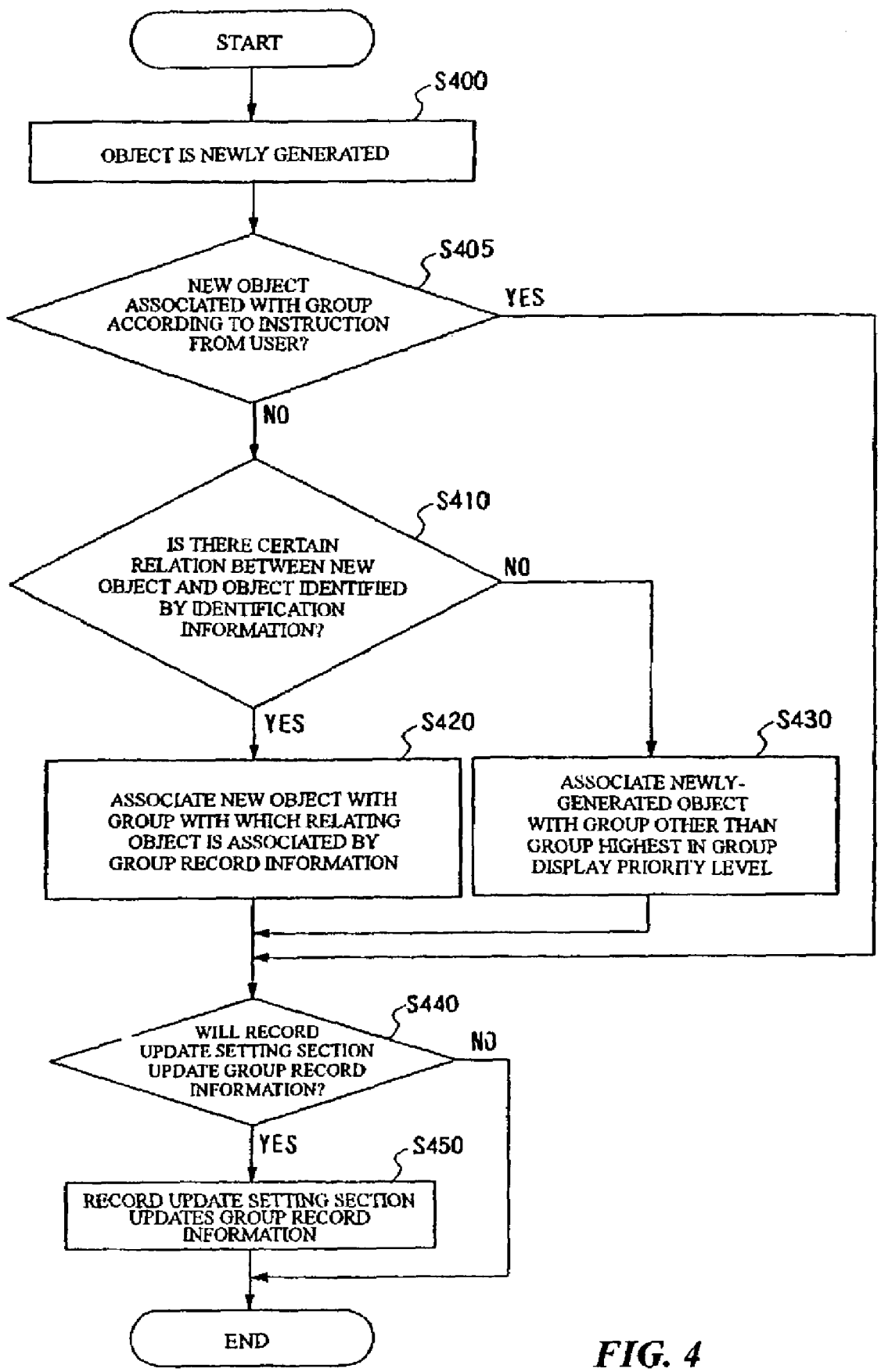
FIG. 4 is a flowchart showing the operation of the group configuration changing section 160 and the record update setting section 165 when a new object is generated.

FIG. 4 is a flowchart showing the operations of the group configuration changing section 160 and the record update setting section 165 when a new object is generated. When a new object is generated (S400), the record update setting section 165 makes a determination as to whether a new object has been associated with a group according to an instruction from a user (S405). If the new object has not been associated with a group according to an instruction from a user (S405: NO), the group configuration changing section 160 makes a determination as to whether there is a certain relation between the newly-generated object and an object identified from identification information (S410). If the group configuration changing section 160 determines that there is a certain relation between the newly-generated object and an object identified from identification information stored in the recording section 150 (S410: YES), the group configuration changing section 160 associates the newly-generated object with the group with which the relating object has been associated by group record information in the recording section 150 (S420). If group configuration changing section 160 determines that there is no certain relation (S410: NO), the group configuration changing section 160 associates the newly-generated object with a group other than the group highest in group display priority level (S430). Subsequently (after S420, after S430, S405: YES), the record update setting section 165 makes a determination as to which one of a setting to update group record information and a setting not to perform updating is made (S440). If a setting to update group record information is made in the record update setting section 165 (S440: YES), the record update setting section makes the recording section 150 update group record information (S450).

Figure 5:
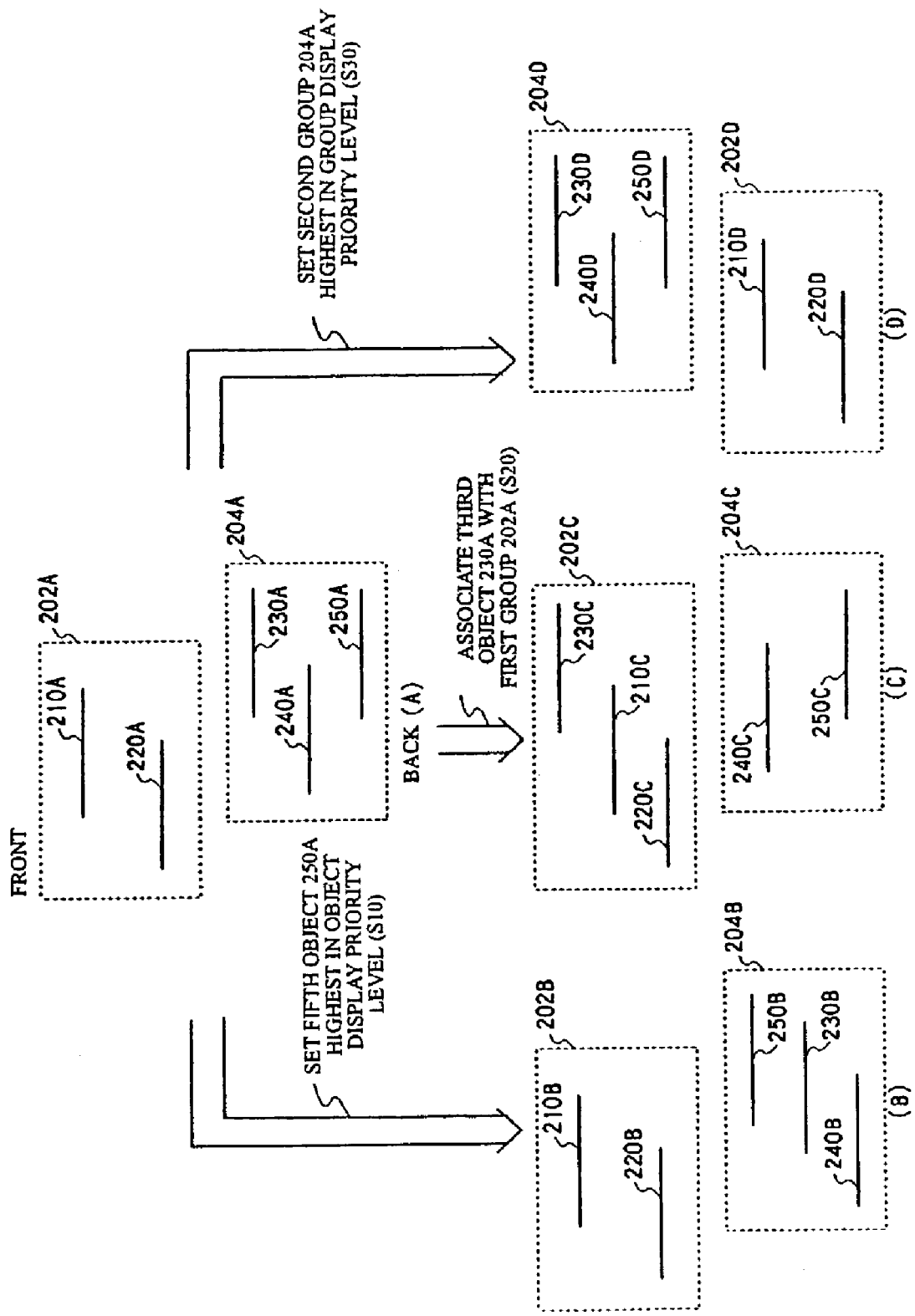
FIG. 5 is a schematic diagram of the operation of the display device 10 displaying objects at the front in an in an overlaid state.

FIG. 5 is a schematic diagram of the operation of the display device 10 displaying objects at the front by overlaying the objects one on another. In each of (A), (B), (C), and (D) of FIG. 5 is illustrated a state in which objects are displayed while being overlaid. Placement of an object at a higher position as viewed in the figure represents a state where the object is displayed closer to the front, while placement of an object at a lower position represents a state where the object is displayed closer to the back. As shown in the sections of FIG. 5, the display device 10 displays the first object 210, the second object 220, the third object 230, the fourth object 240 and the fifth object 250. The operation of the display device 10 will be described with respect to changing the state shown in (A) of FIG. 5 into the state shown in (B), changing the state shown in (A) into the state shown in (C), and changing the state shown in (A) into the state shown in (D) in this order.

Referring to (A) of FIG. 5, the first object 210A and the second object 220A are associated with the first group 202A, while the third object 230A, the fourth object 240A and the fifth object 250A are associated with the second group 204A. The first object 210A, the second object 220A, the third object 230A, the fourth object 240A and the fifth object 250A are displayed by being positioned in this order from the front.

In (B) of FIG. 5 is illustrated a state after the object display priority level changing section 170 has set the fifth object 250A highest in object display priority level (S10) from the state shown in (A) of FIG. 5. The operation shown in this section of FIG. 5 is an example of the object priority level changing operation (S510) performed by the object priority level changing section 170 as shown in FIG. 3. The first object 210B and the second object 220B are associated with the first group 202B, while the fifth object 250B, the third object 230B and the fourth object 240B are associated with the second group 204B. Thus, even if the object display priority level of the fifth object 250B is changed, the fifth object 250B is not displayed at the front of the first object 210B and the second object 220B associated with the first group 202B. As a result, the first object 210B, the second object 220B, the fifth object 250B, the third object 230B and the fourth object 240B are displayed by being positioned in this order from the front.

That is, a user can temporarily refer to the fifth object 250B by operating the display device 10 while displaying at the front the first object 210B and the second object 220B used for a main work purpose.

In (C) of FIG. 5 is illustrated a state after the third object 230A has been associated with the first group 202A (S20) from the state shown in (A) of FIG. 5. The operation shown in this section of FIG. 5 is an example of the association information changing operation (S550) performed by the group configuration changing section 160 as shown in FIG. 3. The third object 230C, the first object 210C, and the second object 220C are associated with the first group 202C, while the fourth object 240C and the fifth object 250C are associated with the second group 204C. Thus, the third object 230C can be displayed at the foremost position by newly associating the third object 230C with the first group 202C. Also, the third object 230C will not be displayed at the back of the fourth object 240C and the fifth object 250C associated with the second group 204C. As a result, the third object 230C, the first object 210C, the second object 220C, the fourth object 240C and the fifth object 250C are displayed by being positioned in this order from the front.

That is, the user can operate the display device 10 so as to prevent the third object 230C from being hidden behind the fourth object 240C or the fifth object 250C after the user has selected the third object for use in a main work purpose.

In (D) of FIG. 5 is illustrated a state after the group rank changing section 140 has set the second group 204A highest in group display priority level (S30) from the state shown in (A) of FIG. 5. The operation shown in this section of FIG. 5 is an example of the group display priority level changing operation (S530) performed by the group rank changing section 140 as shown in FIG. 3. The third object 230D, the fourth object 240C and the fifth object 250D are associated with the second group 204D, while the first object 210D and the second object 220D are associated with the first group 202D. Thus, the group displayed at the front and the group displayed at the back can be replaced by changing the group display priority levels of the first group 202D and the second group 204D. As a result, the third object 230D, the fourth object 240D, the fifth object 250D, the first object 210D and the second object 220D are displayed by being positioned in this order from the front.

That is, the user can do work smoothly with the display device 10 by preventing the object group associated with the second group 204D from being hidden behind the object group associated with the first group 202D after the user has selected the object group associated with the second group 204D for use in a main work purpose.

Figure 6:
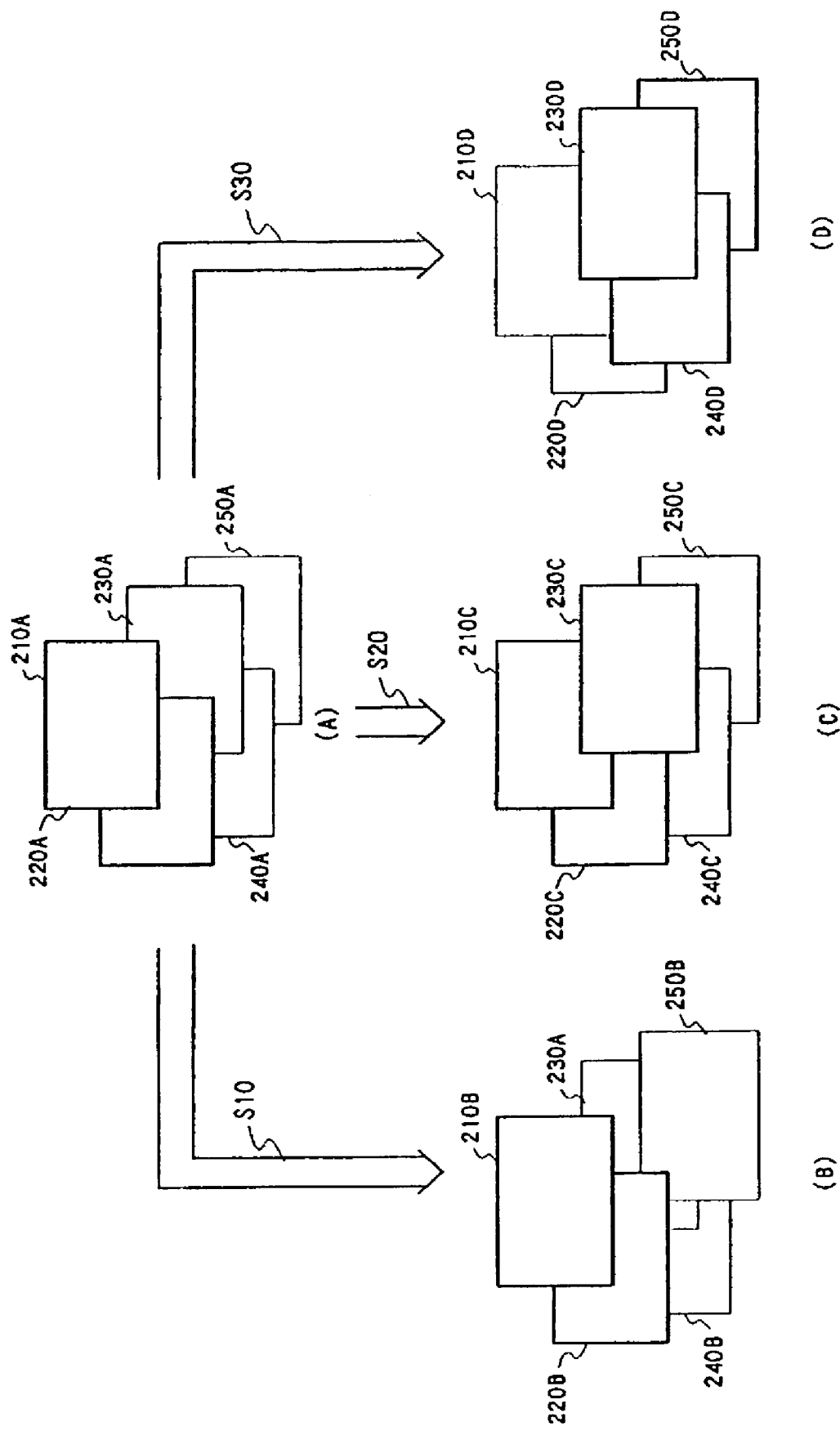
FIG. 6 is a diagram showing operations performed by a user to change the overlaid state of objects by operating the display device 10.

FIG. 6 is a diagram showing operations performed by a user to change the overlaid state of objects by operating the display device 10. In each of (A), (B), (C), and (D) of FIG. 6 is illustrated a state in which objects are displayed while being overlaid. The sections of FIG. 6 correspond respectively to those of FIG. 5. Rectangular areas shown in overlapped states in FIG. 6 represent an example of objects. Of these objects, those represented by the rectangular areas indicated by the thick line are associated with a group of a higher group display priority level. As shown in each section of FIG. 6, the display device 10 displays the first object 210, the second object 220, the third object 230, the fourth object 240 and the fifth object 250. Changes of display contents from (A) to (B) of FIG. 6, from (A) to (C) of FIG. 6, and from (A) to (D) of FIG. 6 made by the display device 10 will be described in this order.

Referring to (A) of FIG. 6, the first object 210A and the second object 220A are associated with the first group 202A, while the third object 230A, the fourth object 240A and the fifth object 250A are associated with the second group 204A. The first object 210A, the second object 220A, the third object 230A, the fourth object 240A and the fifth object 250A are displayed by being positioned in this order from the front to the back.

In (B) of FIG. 6 is illustrated a state after the object display priority level changing section 170 has set the fifth object 250A highest in object display priority level (S10) from the state shown in (A) of FIG. 6. The association between the objects and the first and second groups 202B and 204B is the same as in the case shown in (A) of FIG. 6. The fifth object 250B is displayed at the front of the third object 230B and the fourth object 240B and at the back of the first object 210B and the second object 220B.

In (C) of FIG. 6 is illustrated a state after the group configuration changing section 160 has associated the third object 230A with the first group 202A (S20) from the state shown in (A) of FIG. 6. Since the third object 230C has been associated with the first group 202A in the higher group display priority level, it is displayed at the front of the fourth object 240C and the fifth object 250C.

In (D) of FIG. 6 is illustrated a state after the group rank changing section 140 has set the second group 204A highest in group display priority level (S30) from the state shown in (A) of FIG. 6. The association between the objects and the first and second groups 202D and 204D is the same as in the case shown in (A) of FIG. 6. The third object 230D, the fourth object 240D and the fifth object 250D are displayed at the front of the first object 210D and the second object 220D.

Figure 7:
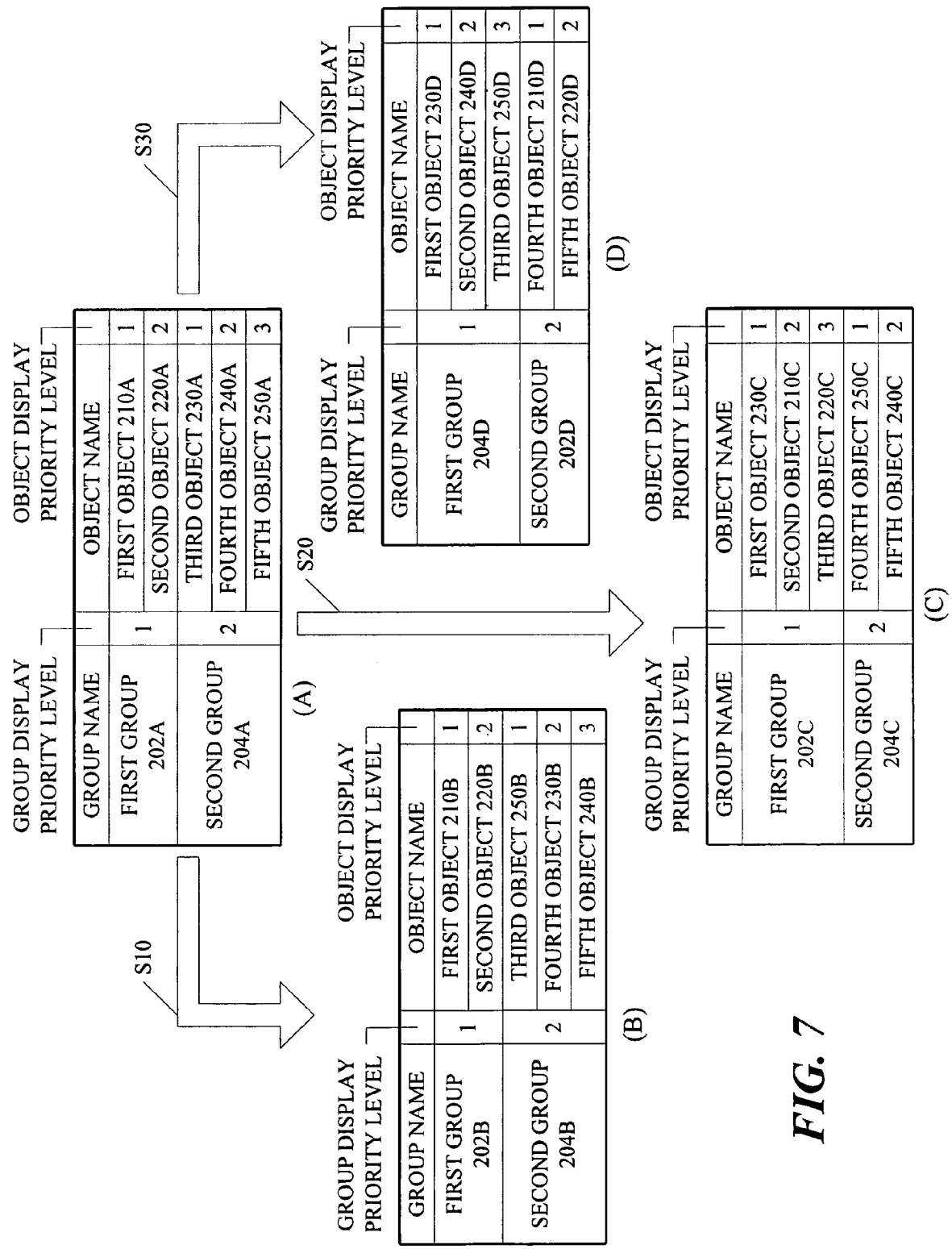
FIG. 7 is a diagram showing the operation of the display device 10 changing group display priority levels, object display priority levels, and association information respectively stored in the group priority level storage section 120, the object priority level storage section 110, and the group configuration storage section 100.

FIG. 7 shows changes made by the display device 10 in group display priority levels, object display priority levels, and association information respectively stored in the group priority level storage section 120, the object priority level storage section 110, and the group configuration storage section 100. The structure shown in each of the sections (A) to (D) of FIG. 7 is the same as that shown in FIG. 2, and the description for it will not be repeated. The sections of FIG. 7 correspond respectively to those of FIG. 5. Changes in data from (A) to (B) of FIG. 7, from (A) to (C) of FIG. 7, and from (A) to (D) of FIG. 7 made by the display device 10 will be described in this order.

Referring to (A) of FIG. 7, the first object 210A and the second object 220A are associated with the first group 202A, while the third object 230A, the fourth object 240A and the fifth object 250A are associated with the second group 204A. The group display priority levels of the first group 202A and the second group 204A are 1 and 2, respectively. That is, all the objects associated with the first group 202A are displayed at the front of all the objects associated with the second group 204A. In the first group 202A, the object display priority levels of the first object 210A and the second object 220A are 1 and 2, respectively. Similarly, in the second group 204A, the object display priority levels of the third object 230A, the fourth object 240A, and the fifth object 250A are 1, 2, and 3, respectively. Consequently, the first object 210A, the second object 220A, the third object 230A, the fourth object 240A and the fifth object 250A are displayed by being positioned in this order from the front.

In (B) of FIG. 7 is illustrated a state after the object display priority level changing section 170 has set the fifth object 250A highest in object display priority level (S10) from the state shown in (A) of FIG. 7. The association between the objects and the first and second groups 202B and 204B is the same as in the case shown in (A) of FIG. 7. The group display priority levels of the first group 202B and the second group 204B are the same as those shown in (A) of FIG. 7. From the second group 204A, the object display priority levels of the fifth object 250A, the third object 230A, and the fourth object 240A are changed to 1, 2, and 3, respectively. Consequently, the fifth object 250B is displayed at the front of the third object 230B and the fourth object 240B and at the back of the first object 210B and the second object 220B.

In (C) of FIG. 7 is illustrated a state after the group configuration changing section 160 has associated the third object 230A with the first group 202A (S20) from the state shown in (A) of FIG. 7. The third object 230C is newly associated with the first group 202C in the higher group display priority level. In the first group 202C, the object display priority levels of the third object 230C, the first object 210C and the second object 220C are changed to 1, 2, and 3, respectively. Consequently, the third object 230C is displayed at the front of the first object 210C and the second object 220C.

In (D) of FIG. 7 is illustrated a state after the group rank changing section 140 has set the second group 204A highest in group display priority level (S30) from the state shown in (A) of FIG. 7. The association between the objects and the first and second groups 202D and 204D is the same as in the case shown in (A) of FIG. 7. The group display priority levels of the first group 202D and the second group 204D are changed to 2 and 1, respectively. Consequently, the third object 230D, the fourth object 240D and the fifth object 250D associated with the second group 204D are displayed at the front of the first object 210D and the second object 220D associated with the first group 202D.

As is apparent from the foregoing, the display device 10 can change object display priority levels by the function of the object priority level changing section 170 while holding information indicating the association between groups and objects. Therefore a user can smoothly perform intended processing by operating the display device 10 so that objects to be used for the processing are associated with a group higher in display priority level to prevent the objects from being hidden behind other objects lower in display priority level.

Figure 8:
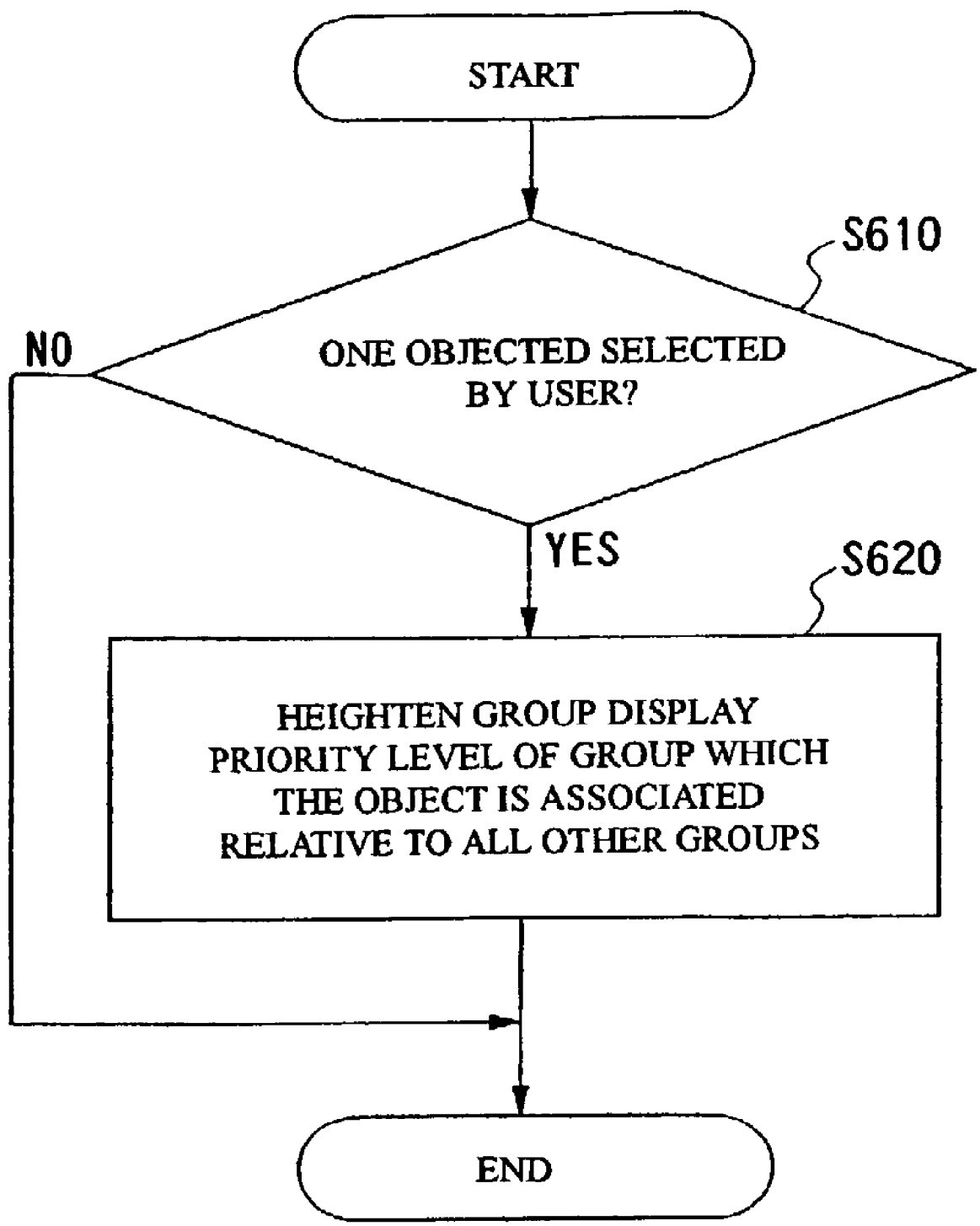
FIG. 8 is a flowchart showing the operation of a group rank changing section 140 in a second embodiment of the present invention.

FIG. 8 is a flowchart showing the operation of the group rank changing section 140 in a second embodiment of the present invention. The same functional block diagram as FIG. 1 can be referred to for the description of this embodiment, and this embodiment differs from the first embodiment only in operation. The operation of this embodiment will be described with respect to a point of difference. The group rank changing section 140 makes a determination as to whether a user selects an object (S610). If the operator selects an object (S610: YES), the group rank changing section 140 changes the group display priority level of the group with which the object is associated so that the group display priority level is higher than those of all the other groups (S620).

Figure 9:
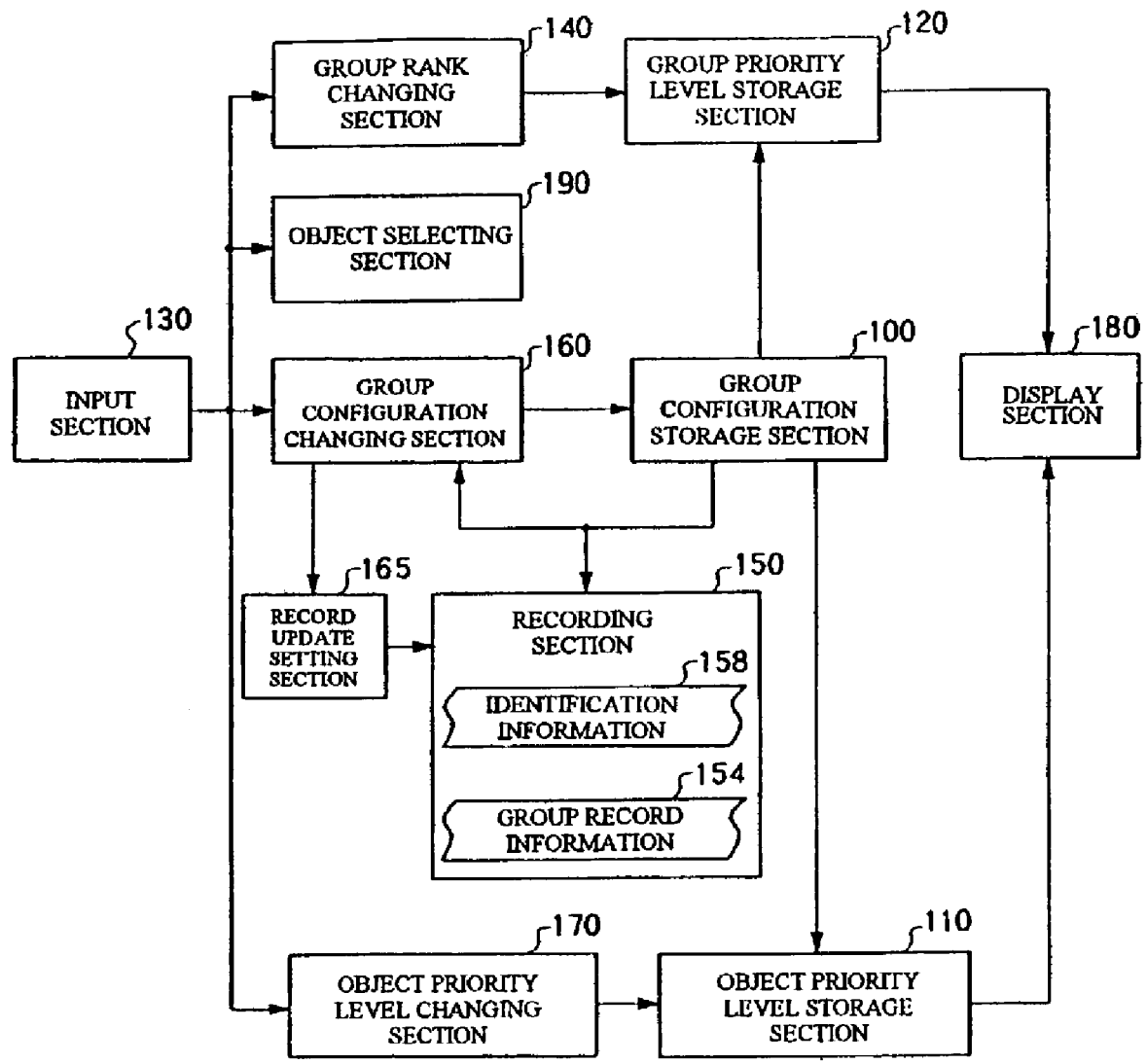
FIG. 9 is a functional block diagram of a display device in a third embodiment of the present invention.

FIG. 9 is a functional block diagram of a display device 10 in a third embodiment of the present invention. The display device 10 of this embodiment is constructed by adding an object selecting section 190 to the display device of the first embodiment.

The input section 130 accepts a mouse clock as an operation for changing an object. That is, an object designated by a mouse click is regarded as selected. When the input section 130 accepts this selecting operation from a user, it transmits a first instruction to the object selecting section 190.

The input section 130 accepts an input made by using a keyboard shortcut key as a priority operation for associating the object with a group highest in group display priority ran. When accepting the priority operation from the user, the input section 130 transmits a second instruction to the group configuration changing section 160.

When the object selecting section 190 receives the first instruction from the user through the input section 130, it selects the object according to the instruction from the user. The object selecting section 190 may select this object when some object is operated by the user for a different purpose and when the first instruction is received. The object selecting section 190 transmits information for identification of this selected object to the group configuration changing section 160.

The group configuration changing section 160 receives information for identification of the objected selected by the object selecting section 190. When group configuration changing section 160 receives the second instruction from the input section 130, it associates the selected object with the group highest in group display priority level.

That is, the group configuration changing section 160 associates the object selected by a mouse click made by depressing the keyboard shortcut key with the group highest in group display priority level.

In this embodiment, as is apparent from the foregoing, a user can associates a target object with a group of the highest group display priority level by a simple operation.

Figure 10:
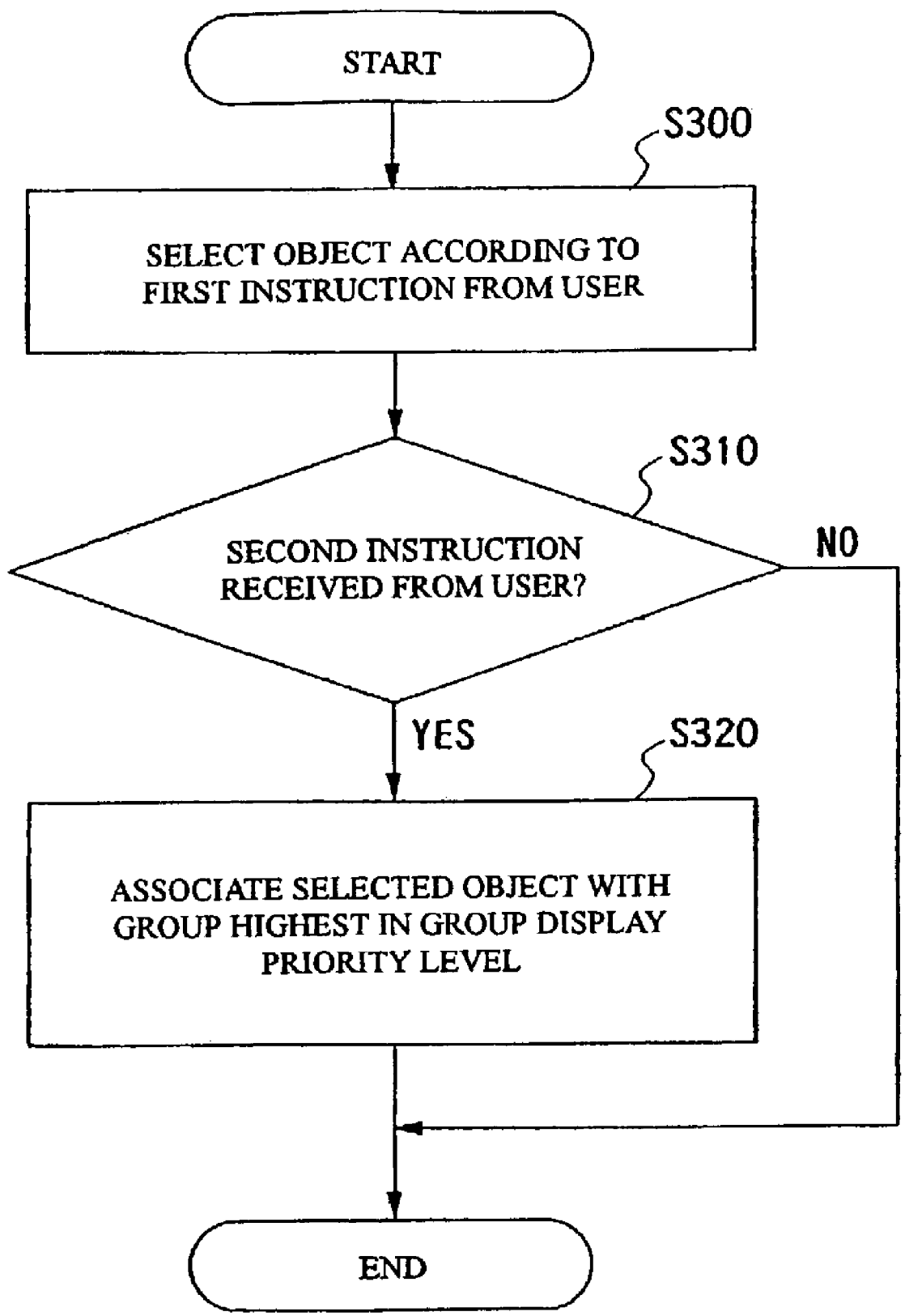
FIG. 10 is a flowchart showing the operations of a group configuration changing section 160 and an object selecting section 190 in the third embodiment of the present invention.

FIG. 10 is a flowchart showing the operations of the group configuration changing section 160 and the object selecting section 190 in the third embodiment of the present invention. The object selecting section 190 selects an object according to a first instruction from a user (S300). The group configuration changing section 160 makes a determination as to whether a second instruction has been received from the user (S310). If the second instruction has been received from the user (S310: YES), the group configuration changing section 160 associates the selected object with a group of the highest group display priority level (S320).

Figure 11:
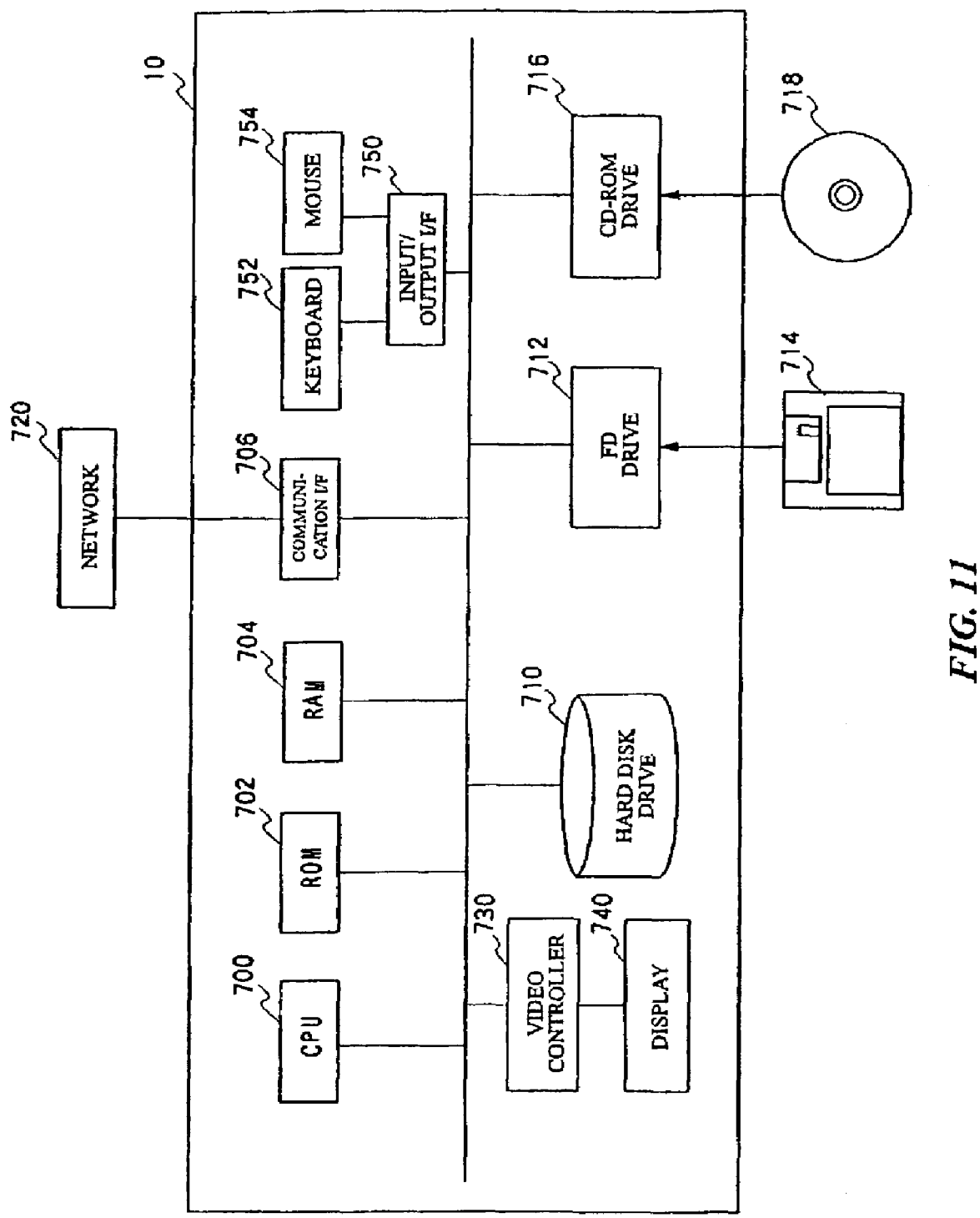
FIG. 11 is a diagram showing a hardware configuration of a display device 10 according to an embodiment of the present invention.

FIG. 11 shows an example of a hardware configuration of the display device 10 according to an embodiment of the present invention. The functions of the display device 10 according to the embodiment are realized by the cooperation of a computer having a CPU 700, a read only memory (ROM) 702, a random access memory (RAM) 704, a communication interface (communication I/F) 706, a hard disk drive 710, a video controller 730, a display 740, an input/output interface (input/output I/F) 750, a keyboard 752, and a mouse 754, and a program which runs on the computer. The display device 10 may also have a floppy disk (FD) drive 712 and/or a compact disk-read only memory (CD-ROM) drive 716.

The program for realizing the display device 10 has a group rank changing module, a group configuration changing module, an object priority level changing module, an object selecting module, a group rank storage module, an object priority level storage module, a group configuration storage module, and a display module. These modules are programs for making the computer as group rank changing section 140, group configuration changing section 160, object priority level changing section 170, object selecting section 190, group priority level storage section 120, object priority level storage section 110, group configuration storage section 100, and display section 180.

The above-described program may be stored in an external storage medium. As such a storage medium, a floppy disk 714, a CD-ROM 718, an optical recording medium such as a digital versatile disk (DVD) or a phase change rewritable disk (PD), a magnetic recording medium such as MiniDisc (MD), a tape medium, a semiconductor memory such as an IC card may be used. Also, the program may be provided to the program display device 10 through a network 720 by using as a recording medium a storage device such as a hard disk or a RAM provided in a server system connected to a private communication network or the internet.

While the embodiments has been described with respect to embodiments thereof, the technical scope of the present invention is not limited to that referred to in the description of the embodiments. Various change or modifications may be made in the described embodiments. As is apparent from the appended claims, modes of the present invention including such changes and modifications are included in the technical scope of the invention.

According to the above-described embodiments, a display device, display method, a display program and a recording medium set forth in the following terms can be realized.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
a display device which displays a plurality of objects on a screen;
a group configuration storage section for storing association information indicating the association between each of said plurality of objects and one of a plurality of groups;
a group configuration changing section for changing said association information stored in said group configuration storage section;
a group priority level storage section for storing group display priority levels which are priority levels for displaying each of said objects associated with one of said groups at the front of the objects associated with the other groups;
a group rank changing section for changing said group display priority levels stored in said group priority level storage section in response to a user input;
an object priority level storage section for storing object display priority levels which are priority levels for displaying one of the objects associated with one of said groups at the front of the others;
an object priority level changing section for changing said object display priority level while said association information is maintained;
a display section for displaying said plurality of objects according to said group display priority levels and said object display priority levels; and
a recording section for storing a record of said objects displayed by said display section, and the association between the objects and the groups at the time of display,
wherein as each new object is generated, said group configuration changing section associates said new object with the group with which one of said objects having a certain relation with the new object in said group record information stored in said recording section is associated, said recording section including a record update setting section for providing a setting as to whether said group recording section will be updated,
said group rank changing section being responsive to selection of a displayed object by the user to heighten the display priority level of the group with which the selected object is associated.

2. Apparatus according to claim 1, wherein said display section displays a window for displaying an output from a program as one of said objects.

3. Apparatus according to claim 1, further comprising an object selecting section for selecting one of the plurality of objects according to a first instruction from a user, wherein said group configuration changing section associates said one of the objects with one of the groups highest in group display priority level when it receives a second instruction from the user.

4. Apparatus according to claim 1, wherein said group configuration changing section associates a newly-generated object with one of said plurality of groups selected by a user.

5. Apparatus according to claim 1, wherein said group configuration changing section associates a newly-generated object with one of the plurality of groups other than said group highest in group display priority level.

6. Apparatus according to claim 1, wherein said recording section stores the group record information on a nonvolatile recording medium.

7. Apparatus according to claim 1, further comprising an input section for accepting an input from a user, and wherein said object priority level changing section changes said object display priority levels when said input section accepts an object priority level changing operation, and further wherein said group configuration changing section changes said the association information stored in said group configuration storage section when said input section accepts a group configuration changing operation different from said object priority level changing operation.

8. Apparatus according to claim 1 further comprising an input section for accepting an input from a user, wherein said object priority level changing section changes the object display priority levels when said input section accepts an object priority level changing operation, and further wherein said group rank changing section changes said group display priority levels stored in said group priority level storage section when said input section accept a group rank changing operation different from said object priority level changing operation.

* * * * *